US006840368B2

(12) United States Patent
Betti et al.

(10) Patent No.: US 6,840,368 B2
(45) Date of Patent: Jan. 11, 2005

(54) ACCUMULATOR FOR ELONGATED PRODUCTS, SUCH AS TUBES AND THE LIKE (75) Inventors: Giulio Betti, Lucca (IT); Angelo Benvenuti, Lucca (IT); Walter Di Nardo, Lucca (IT)

(73) Assignee: Fabio Perini S.p.A., Lucca (IT)

( * ) Notice: Subject to any disclaimer, the term of this patent is extended or adjusted under 35 U.S.C. 154(b) by 0 days.

(21) Appl. No.: 10/481,608

(22) PCT Filed: Jun. 21, 2002

(86) PCT No.: PCT/IT02/00412
§ 371 (c)(1),
(2), (4) Date: Dec. 22, 2003

(87) PCT Pub. No.: WO03/002437
PCT Pub. Date: Jan. 9, 2003

(65) Prior Publication Data
US 2004/0231959 A1 Nov. 25, 2004

(30) Foreign Application Priority Data
Jun. 29, 2001 (IT) ...................................... FI2001A0121

(51) Int. Cl.⁷ ................................................ B65G 1/00
(52) U.S. Cl. ..................... 198/347.3; 198/594; 198/801
(58) Field of Search ............................. 198/347.3, 594, 198/794, 801, 812, 484.1, 803.13

(56) References Cited

U.S. PATENT DOCUMENTS

| 1,979,553 | A | * | 11/1934 | Hunter | ........................ 198/801 |
| 2,134,832 | A | * | 11/1938 | Morrison | ..................... 198/801 |
| 4,142,626 | A | | 3/1979 | Bradley | |
| 4,168,776 | A | | 9/1979 | Hoeboer | |
| 6,053,304 | A | | 4/2000 | Biagiotti | |

FOREIGN PATENT DOCUMENTS

| FR | 2 576 582 A1 | 8/1986 |
| WO | WO 97/42110 A1 | 11/1997 |

* cited by examiner

Primary Examiner—Joseph E. Valenza
(74) Attorney, Agent, or Firm—Breiner & Breiner, L.L.C.

(57) ABSTRACT

The accumulator (5) comprises at least two continuous flexible members (55) equipped with supports (57) for the products (A). The supports (57) project laterally with respect to the respective flexible member; each flexible member and at least one first guide wheel (63A) being arranged so that the supports face the axis of the wheel in the section of flexible member trained about said guide wheel. The guide wheel is equipped with a plurality of radial arms between which a space is provided for the elongated products resting on said supports. The position of the supports is timed with respect to the position of the radial arms.

18 Claims, 5 Drawing Sheets

ACCUMULATOR FOR ELONGATED PRODUCTS, SUCH AS TUBES AND THE LIKE

FIELD OF THE INVENTION

The present invention relates to an accumulator or storage unit for temporarily accumulating elongated products, such as tubes or the like, comprising at least two continuous flexible members developing each along a respective closed path defined by a plurality of guide wheels, the paths defined by said flexible members being reciprocally parallel, and in which said flexible members are equipped with supports for the elongated products.

Particularly, but not exclusively, the accumulator may be used for cardboard tubes intended for the production of rolls of plastic film, of papers, such as toilet paper, kitchen paper or other items made of tissue paper and the like.

BACKGROUND OF THE INVENTION

In many industrial fields, filiform or web-shaped materials are wound on tubular winding cores made of plastic, cardboard or other material. These tubular winding cores (hereof also simply called "cores") are accumulated in a storage unit and gradually supplied to the machine which winds the filiform or web-shaped material. The products wound on the cores can be, for example, plastic films, fabrics, non-wovens, paper, tissue paper, or other products in film or sheet form in general.

In the paper converting industry, converting lines with one or more unwinders are used for making rolls of toilet paper, kitchen paper and similar products. The unwinders unwind the web like material from corresponding large diameter rolls and supply it to a rewinder. The rewinder winds predetermined amounts of web-shaped material on cores, which are usually made of cardboard. The cores are made by so-called tube making machines, which are generally arranged by the side of the rewinder. The cores are frequently simply piled up in bin accumulators from where they are taken by a conveyor belt or chain and introduced one at a time in the rewinder. The supply frequency of the cores may currently be in the order of 40 cores/minute.

The rolls formed by the rewinder present a diameter which is equal to the diameter of the finished product to be marketed and a length equal to a multiple of the length of the finished product. The rolls (also called "logs") are, therefore, cut to form the finished smaller rolls.

The paper converting industry tends to use reminders capable of winding rolls with increasingly larger axial lengths, i.e. machines which can handle increasingly wider web like material. It has bead that very long cores tend to assume irregular positions in the currently employed accumulators and even present the tendency to twist one on the other and consequently break, jamming the automatic flow to the rewinder. This entails considerable production problems.

Similar problems may occur in other sectors in which elongated shape products, specifically products with modest flexural resistance, are accumulated and held in an accumulator.

Currently, storage units or accumulators for temporarily accumulating the rolls made by rewinders with two flexible members in the form of reciprocally parallel chains are known in the art. Continuous oscillating supports are fastened to the chains and extend from one of the flexible members to the other, on each of which support a roll is arranged. The flexible members are arranged at a distance which exceeds the length of the roll to be handled. An example of accumulator of this type is described in U.S. Pat. No. 6,053,304.

This type of accumulator is not suitable for handling elongated light objects with small transversal dimensions (such as winding tubes or cores) due to the need to arrange costly and cumbersome oscillating supports which increase the cost of the accumulator.

OBJECTS AND SUMMARY OF THE INVENTION

The object of the present invention is to create an accumulator for temporarily accumulating elongated products—specifically, but not exclusively winding tubes or tubular cores, e.g. made of cardboard, for the production of rolls of ribbon-shaped material—which overcomes the shortcomings of the storage units known in current art and permits the handling of products which may also be very long and present modest flexural resistance.

Particularly, one object of the present invention is the realization of an accumulator which is particularly suitable for handling light and elongated products requiring intermediate support along their axial development.

These and other objects and advantages, which will be clear to experts in the field in the text that follows, are obtained in practice by an accumulator of the type initially mentioned in which: each flexible member and at least one first guide wheel in the respective closed path defined by the flexible member is arranged in such a way that the supports face the axis of the wheel in the section of flexible member turning on said first guide wheel; and in which said at least one guide wheel is provided with a plurality of radial arms with flexible member contact means; among the consecutive radial arms a space being created for the elongated products resting on said supports and the position of the supports being timed with respect to the position of the radial arms.

Essentially, in this way, the guide wheels can also be in an intermediate position with respect to the products to be accumulated and not necessarily in correspondence with the ends of the products. As a matter of fact, the products can extend through the wheels, between the wheels and the respective flexible member, being arranged in the free space between the consecutive radial arms. Advantageously, the supports are angularly timed with the radial arms of the wheels, so that the supports are in the same angular position as the radial arms in the area in which the flexible member is trained about said wheels.

In this way, the accumulator is particularly suitable for handling long and light objects. The accumulator particularly lends itself for handling tubular winding cores which are temporarily stored, holding them reciprocally separate, avoiding twisting and consequent damage. The possibility of having objects which extend between the flexible member and the guide wheel is exploited to arrange the flexible members and the respective supports in intermediate positions along the axial development of the products. In this way, intermediate rests are provided along the products, without the need for continuous oscillating support elements, which are at least as long as the products themselves, as in the case of accumulators which are traditionally used for rolls.

The result is a light-weight, compact and cost-effective accumulator, suitable also for supporting objects such as tubular cardboard cores of high length and modest flexural resistance.

In practice, as clearly appears from the following description, a plurality of guide wheels around some of which the flexible member and the respective supports are arranged as mentioned above, i.e. with the supports radially facing the axis of the wheels, is arranged along each path defined by each flexible member.

In a practical form of embodiment of the invention, the flexible members consist of chains and the contact means on the outermost radial ends of the radial arms of said guide wheels consist of one or more teeth meshing with the links of the chains. In practice, the guide wheels are in this case pinions for chains whose teeth have been partly removed and left only in correspondence with the radial arms. This does not exclude the possibility that the contact means between the guide wheels and the flexible members may be configured in a different way, e.g. in the form of friction surfaces or simple resting surfaces. Timing between the flexible member and the guide wheel must however be guaranteed. Alternatively, flexible members in the form of toothed belts and corresponding teeth on the guide wheel can be employed.

The radial arms may advantageously present a tapered intermediate area so to provide a large space for the products accumulated in the accumulator in order to leave a sufficient space for the passage of products without excessively reducing the contact surface between the wheel and the flexible member. Conversely, the outermost radial end of each of the radial arms presents a development in the tangential direction which is higher than the width in said intermediate tapered area, so to increase the contact surface with the flexible member, i.e. the number of teeth in the case in which the flexible member is a chain.

The supports for the products to be stored in the accumulator can be advantageously formed by laminar components which are rigidly connected to the flexible members. In the case in which the flexible members are made of chains, each support can be formed by a laminar component which is rigidly connected to a link of the chain. The component can even be an element of the link.

According to a particularly advantageous embodiment, each support presents an end fastened to the respective flexible member and a portion forming a resting surface for the products, between the end and said resting surface the support being folded to distance the resting surface from the lying surface of the respective flexible member.

In practice, the supports can present two counterpoised resting surfaces for said products, so that a product can rest either on one surface or the other. In practice, the rotation on each guide wheel causes the passage of each product from a resting surface of a support to the opposite resting surface of the support arranged immediately either upstream or downstream.

The supports can be variously shaped but according to a particularly advantageous embodiment of the invention, the supports present V-shaped resting surfaces, which is particularly suitable for the circular cross-section of the tubular winding cores.

Having reduced the contact area between the flexible member and the wheels equipped with radial arms to the end of the radial arms themselves, a slight vibration is induced. This is due to the fact that the contact surface between the flexible member and the wheel is not uniform and continuous and that the flexible member is arranged with a polygonal configuration on the guide wheel. To reduce this vibration, it is advantageous to provide that the radial arms of the various wheels are angularly and reciprocally displaced. Particularly, the radial arms of the wheels which are on the same axis can be angularly displaced. For example, if the accumulator presents four flexible members developed along four closed paths lying on an equal number of reciprocally parallel planes, a contoured guide wheel with radial arms allowing the passage of the product between the flexible member and the wheel will be provided. All these wheels will be aligned on the same axis. The wheels can be reciprocally displaced, e.g. by one chain link or less. In this way, the contact between the radial arms of the single wheels and the various flexible members is not simultaneous for all flexible members, whereby reducing the vibrations totally transmitted to the accumulator structure. Since the supports are angularly timed with the radial arms of the wheels, this angular displacement of the radial arms causes a slight displacement also of the supports. Consequently, each product rests on a set of supports, e.g. on four supports, aligned along a line which, is slightly slanted instead of being perfectly horizontal. This is, however, perfectly acceptable.

Additional advantageous embodiments of the accumulator according to the invention are set forth in the annexed claims.

BRIEF DESCRIPTION OF THE DRAWINGS

The invention will be better understood following the description and the attached drawings, which show practical and non-limitative embodiments at the invention. In particular, in the drawing.

DETAILED DESCRIPTION OF PREFERRED EMBODIMENTS OF THE INVENTION

Figure 1:
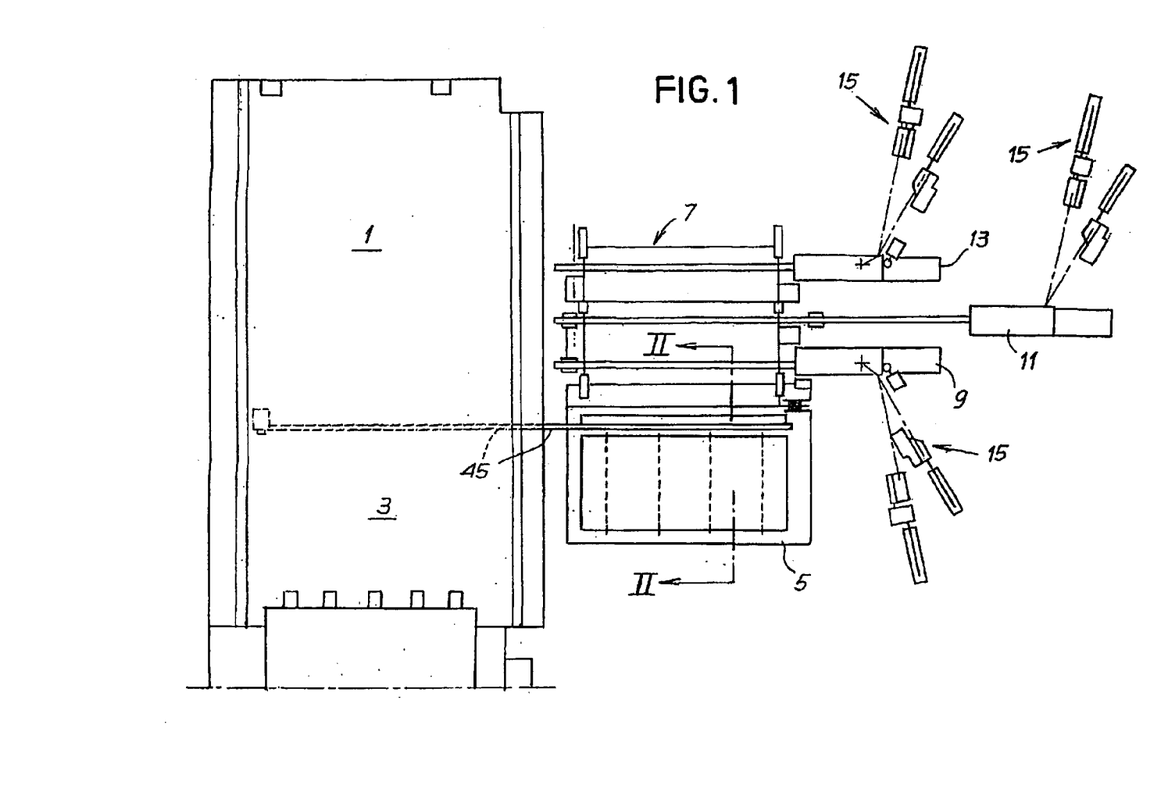
FIG. 1 shows a schematic plan view of the layout of a system comprising an accumulator according to the invention.

FIG. 1 very roughly outlines a layout of a paper converting system for the production of rolls or logs of weblike material. Reference numeral 1 generally indicates the area where the unwinders of the parent rolls, which supply the weblike material, are arranged. Reference numeral 3 indicates the area where the rewinder is located. Other stations (not shown) are arranged downstream to the rewinder, typically one or more glue application machines, a roll accumulator, one or more saw machines and packaging machines.

An accumulator for winding cores, generally indicated with reference numeral 5, which will be described in detail below, is arranged by the side of the area 1, 3 occupied by the unwinders and the rewinder. Reference numeral 7 indicates the outline of a conveyor which supplies the cores to the accumulator 5. The cores are made (in the example shown) by three tube making machines 9, 11, 13, supplied by rolls of ribbons of cardboard 15. It is clear that a different number of tube making machines according to the production rate of the various machines in the system can be used.

The tube making machines 9, 11, 13 (as the other components in the line, with the exception of the storage unit) are not described in detail herein because they are known per se. They can be of any kind, e.g. of the type described in U.S. Pat. No. 5,873,806.

Figure 2:
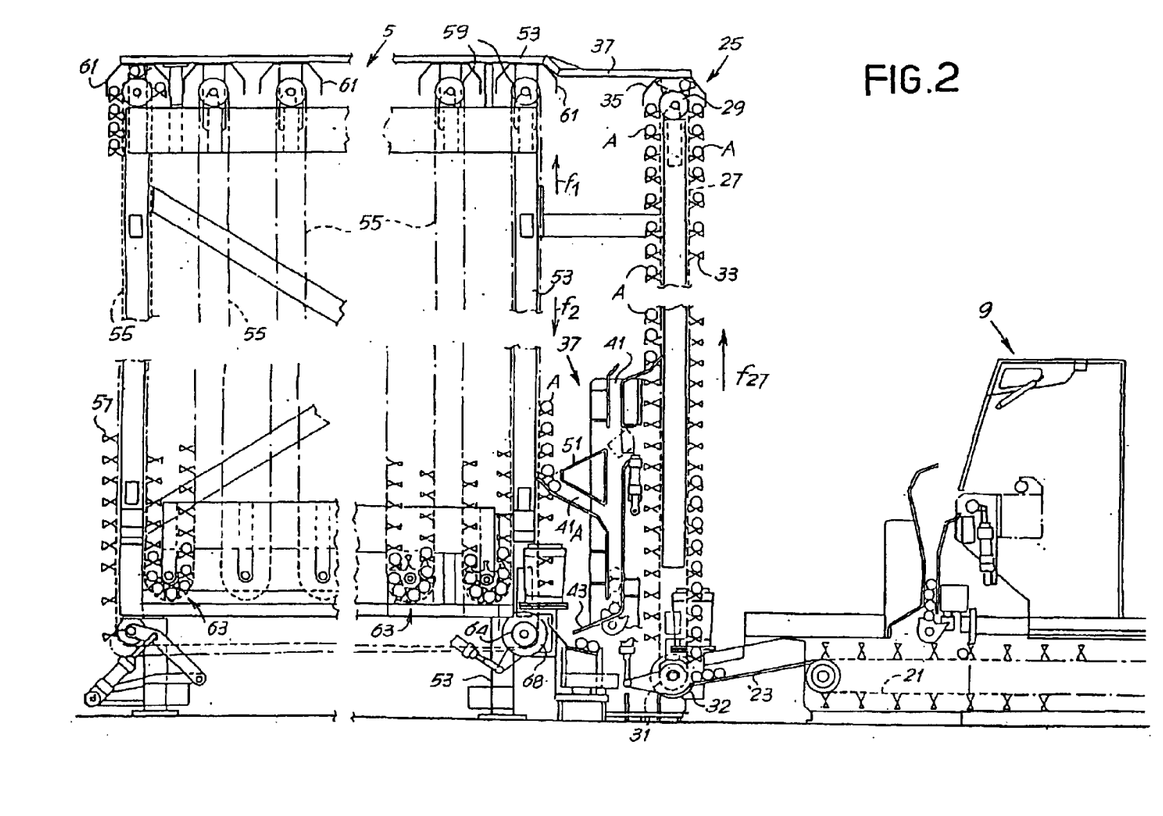
FIG. 2 is a view according to II—II of FIG. 1 of an accumulator according to a first embodiment of the invention.

FIG. 2 shows a lateral view of the accumulator or storage unit generally indicated with reference numeral 5. The tube making machine 9 is also very schematically outlined in this view. The cores A, made in an essentially continuous fashion by the tube making machines 9, 11, 13, are taken by a first horizontal conveyor 21 and conveyed to a chute 23. From here, by gravity, the cores roll down to a vertical conveyor inlet area 25, formed by a set of chains, e.g. four chains arranged reciprocally side by side and lying on an equal number of vertical planes. One of the chains, indicated by reference numeral 27, is visible in FIG. 2 while the others are exactly overlapping and not visible in the Figure.

The chains turn each on two toothed chain wheels, indicated with reference numerals 29 and 31, the first of which is idle and the second of which is driven by a motor 32. Supports 33 which project laterally outwards with respect to the closed path defined by the chain 27 are fastened to the chain.

A guiding surface 35, supported by a fixed structure 37, is developed around each of the upper guide wheels 29. This guiding surface 35 prevents the cores A from dropping when the supports 33 on which they rest move around the axis of the wheels 29.

The individual supports 33 have a symmetric form with two counterpoised V-shaped surfaces and can hold the cores on either of the two V-shaped surfaces, so that in the passage around the upper guide wheels 29, the cores A can pass from one support 33 to the downstream support (with respect to the movement of the chain 27, indicated by the arrow f27).

The accumulator 5 is arranged by the side of the vertical conveyor 25 and a switch, generally indicated by reference numeral 37, is arranged between the two elements.

The switch 37 (visible in detail in FIG. 2) comprises a set of sections 39 arranged side by side which take the cores A from the supports 33 when these pass by the side of the sections 39 by effect of the movement of the chains 27. The sections 39 are slanted and make the cores A roll into a channel 41 underneath. The channel 41 is developed downwards to an oscillating or rotating distributor 42 which at command unloads the cores onto a slanted surface 43, along which the cores roll to reach a transversal conveyor belt 45 which transfers the cores to the rewinder (also see FIG. 1).

Figure 2A:
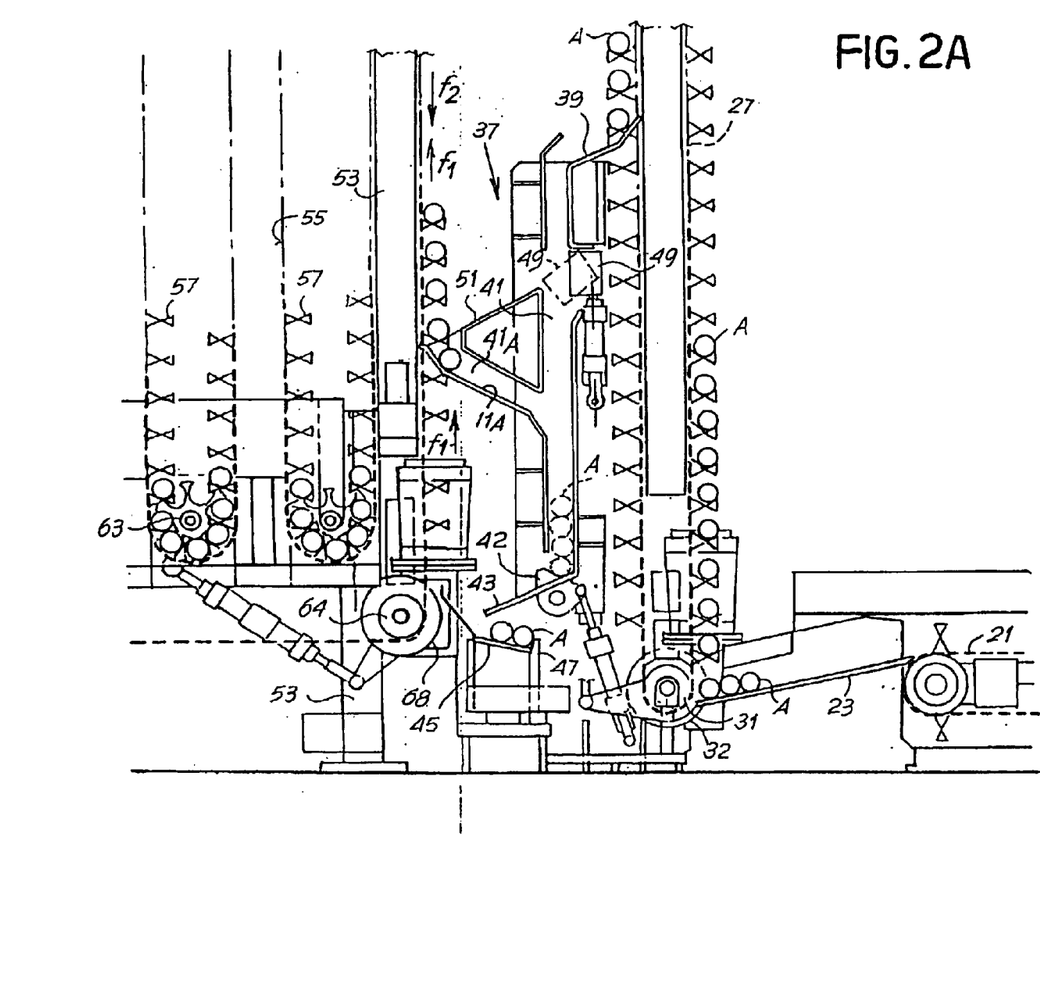
FIG. 2A is a blowup view of a portion of the accumulator in FIG. 2.

As shown in FIG. 2A, the conveyor belt 45 is slanted and presents a resting surface 47 at least along a section of its lowest edge. In this way, the cores A, partially overlapping in the direction of length, can be arranged on the conveyor belt 45. In this way, a very high number of cores can be transferred to the rewinder 3 in a unit of time also if the speed of the conveyor belt 45 is slow.

An interception unit 49 operated by a cylinder-piston actuator or other is arranged along the dropping channel 41. The unit 49 can move from the position, shown with the solid line, in which it leaves the channel 41 free to a position, shown with a dotted line, in which it prevents the cores A from falling along the channel 41 beyond the position of the interception unit 49 itself. In this case, the cores are deviated by the interception unit 49 towards an upper chute 51 which ends in the inlet area of the accumulator 5 to supply the cores A to the accumulator in the way which is described below.

The accumulator 5 comprises a fixed structure 53 carrying a first set of toothed chain wheels in the upper area and a second set of toothed chain wheels in the lower area. FIG. 2 shows some of the toothed wheels in each of the two sets. Chains 55 are trained about the toothed wheels. In practice, the accumulator presents a plurality of chains 55 (e.g. four), lying on an equal number of reciprocally vertical planes, defining closed paths, which are essentially equal. A single chain 55 and a single path are visible in FIG. 2, it being understood that the other chains overlap the one visible in the drawing. Similarly, respective toothed wheels, which define closed paths of the four chains, are provided. The single chain 55, the respective guide wheels and the closed path along which the chain is developed will be described below.

Figure 4:
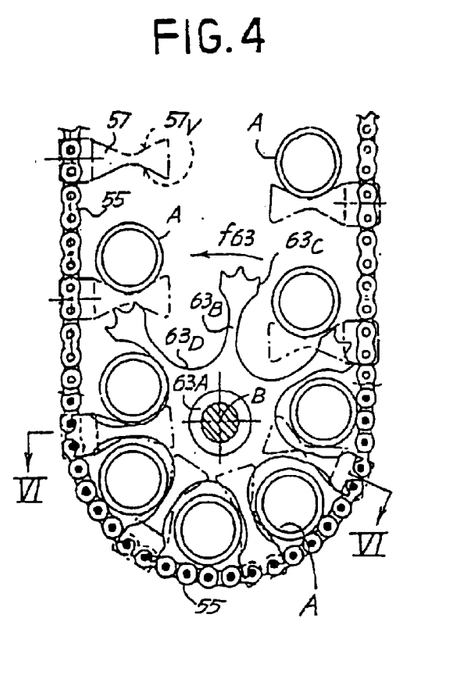
FIGS. 4 and 5 show two blow-up views according to IV—IV and V—V in FIG. 6 of a guide wheel with respective radial arms and a chain turning on it equipped with respective supports.
Figure 5:
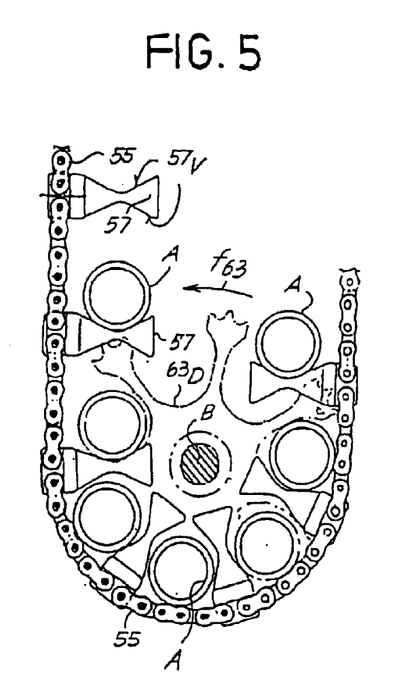
Figure 6:
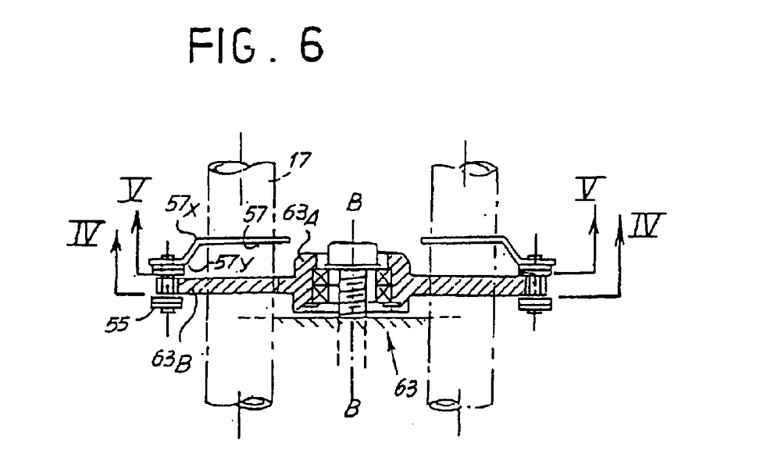
FIG. 6 is a section according to VI—VI in FIG. 4.

Supports 57, similar to supports 33 integral with the chain 27, are fastened to the chain 55. The supports are rigidly fastened to respective links of the chain 55, as will be better described with reference to FIGS. from 4 to 6. As appears in the drawing, the supports 57 (as the supports 33) all project from the same side of the respective flexible member to which they are fastened. More specifically, they extend in a direction which is parallel to the lying plane of the flexible member to which they are fastened, i.e. parallelly to the plane of the Figure. Unlike this solution, the oscillating supports extend between the two flexible members in a direction which is perpendicular to the lying plane of the flexible members themselves to support the rolls in traditional accumulators.

As appears in FIG. 2, the path of the chain 55 is arranged on the upper guide wheels of the first set, indicated with reference numeral 59, so that the supports 57 are outside the path and do not interfere with the transmission toothed wheels 59. A respective guiding surface 61 which is similar to the guiding surface 35 and provided for the same purposes is developed around each of the wheels 59.

The arrangement of the chain 55 and the supports 57 is designed so that in the area around the lower guide wheels of the second set, indicated with reference numeral 63, the supports 57 are radially directed inwards, i.e. towards the axis of the respective wheel 63, and are consequently arranged by the side of the lying plane of the wheels themselves. Consequently, the tubular cores A resting on the supports 57 must be arranged between the chain 55 and the wheel 63 in correspondence with each wheel 63.

This is possible thanks to a particular geometry of the guide wheels 63 with a suitable timing of the wheels and the position of the supports, visible in detail in FIGS. from 4 to 6. FIGS. 4 and 5 show a lateral view and partial sectional view of one of the guide wheels 63 and a corresponding portion of the chain 55 with the respective supports 57. In one of the two Figures, the guide wheel is drawn with a solid line and the supports are drawn with a dotted line, while in the other drawing the guide wheel is drawn with a dotted line and the supports are drawn with a solid line.

FIG. 6 shows a sectional view according to VI—VI in FIGS. 4 and 5.

As appears particularly in FIGS. 4 and 5, the wheel 63 presents a hub 63A from which radial arms or spokes 63B ending with a distal end 63C on which chain teeth meshing the links of the chain 55 are provided. In the example shown, there are seven equally distanced arms 63B. Each arm presents an intermediate area with a smaller width, while the end 63C has a tangential development whose dimension is higher than the width of the central area of the arm. Two consecutive radial arms 63B are connected near the hub 63A by a wide radius section which is approximately circular. Each section, indicated with references 63D, and the sides of the two radial arms 63B, which are connected to it, defines a space—along with the section of the chain which extends between the two ends 63C of said arms—in which an end of the respective tubular core A can be extended. In this way, a plurality of cores A can be located between the chain and the axis B of the guide wheel 63.

The supports 57 are angularly timed with each guide wheel 63 to be located in the same angular position as the radial arms 63B, as clearly shown in FIGS. 4 and 5. In this way, the tubular core A on each support 57 can fit into the space between the chain 55 and the two consecutive arms 63B. During the rotation of the wheel 63, each core is held in this space and passes from support 57, on which it is arranged when it enters the area around the wheel 63, to the support which is directly upstream by turning around the axis B of the wheel, as can be seen in FIGS. 4 and 5, where several cores A are shown in angularly subsequent positions around the wheel 63 and where f63 indicates the direction of rotation of the wheel 63.

The supports 57 present two symmetric V-shaped resting surfaces, indicated with reference 57V in FIGS. 4 and 5.

As appears in FIG. 7, each support 57 consists of a laminar component which is fastened to a respective link of the chain 55 and bent in 57X and 57Y so that the resting surfaces 57V are on a plane which is parallel to the middle plane of the guide wheels 63 at a distance to prevent interference with the wheels.

The contact between each guide wheel 63 and the respective chain 55 is limited to the ends 63C of the radial arms 63B and this may induce a slight vibration in the chains due to the slight knocks which occur when one end 63C comes into contact with the respective chain and because the chain is arranged on said guide wheel according to a polygonal configuration, the vertexes of the polygon being represented by the contact areas with the radial arms of the wheel.

To advantageously reduce the effect of there vibrations on the overall structure of the accumulator, the coaxial guide wheels 63 in the path of the parallel chains 55 are angularly displaced, e.g. by one chain link. The supports 57 of the various chains will be similarly displaced. In this way, the contact between the chain and the arms 63B is not simultaneous for all chains.

Additionally, the accumulator is equipped with an inlet and outlet wheel 64, which is driven by a motor 68. By the rotation of the wheel 64 in the counterclockwise direction, the first branch (on the right in FIGS. 2 and 2A) of the chain 55 moves upwards according to the arrow f1, taking the cores which reach the chute 51. By rotating the opposite direction, the first branch of the chain 55 moves in the direction of the arrow f2, unloading the cores into an unloading channel 41A, fitted in an intermediate position with respect to the channel 41, from where they are sent to the conveyor 45.

Figure 3:
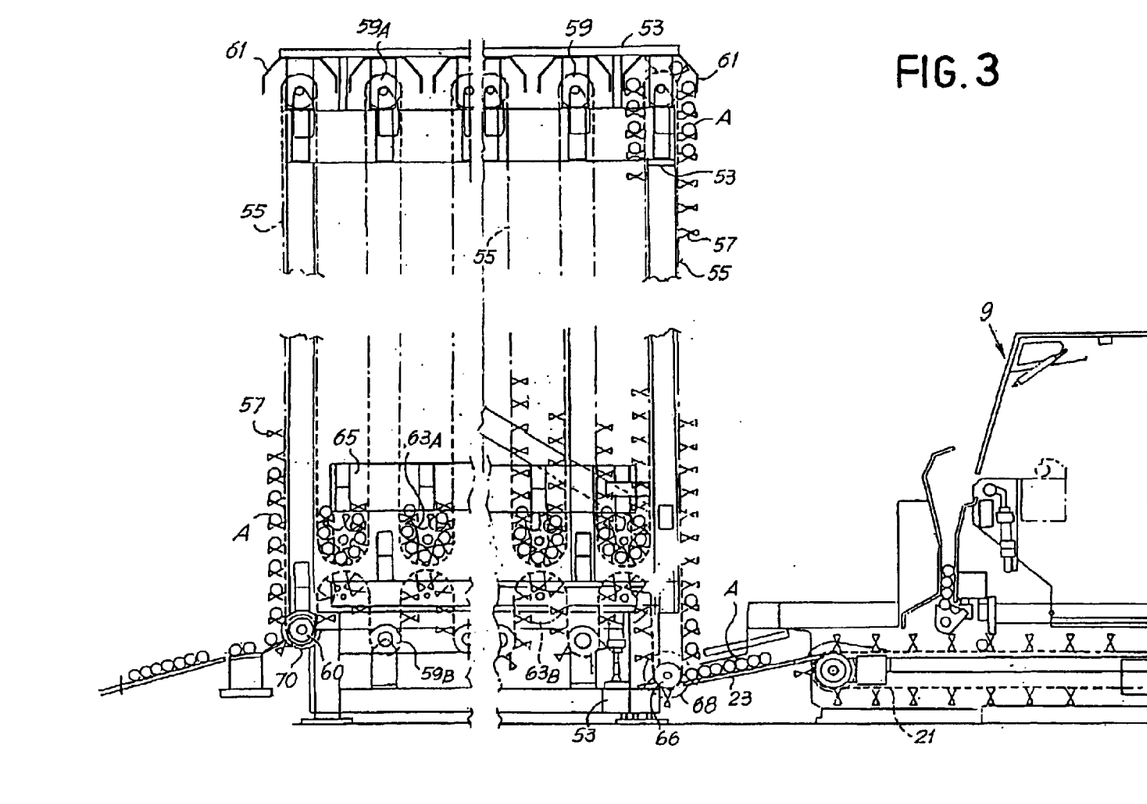
FIG. 3 is a side view similar to the view in FIG. 2 in a different embodiment of the accumulator according to the invention.

FIG. 3 shows a modified configuration of the accumulator according to the invention. Equal reference numerals indicate parts which are either equal or equivalent to those in the example above. The vertical conveyor 25 is missing in this example of embodiment. The cores A are unloaded by the tube making machines 9, 11, 13 onto the horizontal conveyor 21 and taken from here to the chute 23. From the chute 23, the cores reach the supports 57 carried by the chains 55. The chains turn on a set of upper toothed wheels 59A with fixed axis and a set of lower toothed wheels 59B with fixed axis carried by the fixed structure 53. In addition to turning on the fixed axis toothed wheels 59A, 59B, each chain is trained about a set of chain wheels 63A, 63B with a mobile axis. The axes of these wheels are carried by a carriage 65 equipped with an up and down movement along the fixed structure 53, in an essentially equivalent way as specified, for example, in U.S. Pat. No. 6,053,304. In a way which is known per se, the movement of the chains 55 causes the cores A to be arranged on the supports 57 arranged along the branches of the chains located between the wheels 59A and the wheels 63A, while the branches of the chains between the wheels 63B and 59B are empty.

The guide wheels 63A are made in a way corresponding to that of the wheels 63 in the previous embodiment, as shown in FIGS. 4 to 6, while the wheels 63B can be full and present a diameter equal to the wheels 63A. A guiding surface 61 similar to that illustrated in FIG. 2 for the same purposes is developed around the upper fixed axis guide wheels 59A.

The cores are unloaded from the accumulator in the area where the chains are trained about the wheels 60, controlled by a motor 70. The unloading frequency of the cores A is independent from the frequency with which the cores A are supplied by the tube making machine, thanks to the presence of guide wheels 66 turned by a motor 68 independently from the motor 70 on the entry side of the accumulator. The movement of the two motors 70, 68 is appropriately controlled to handle the cores supplied by the tube making machine and provide the cores required by the rewinder.

The accumulator in FIG. 3 is a FIFO (first-in-first-out) accumulator, meaning that the first core A to be loaded into the accumulator is also the first to be unloaded, while the accumulator in FIG. 2 is a LIFO (last-in-first-out) accumulator, because the last core to be loaded in the accumulator is the first to be unloaded to the rewinder.

It is understood that the drawings are provided by way of non-limitative example of the invention only, which can vary in shapes and arrangements, without departing from the scope of the present invention. The possible presence of reference numerals in the claims has the purpose of facilitating comprehension of the claims with reference to the description and does not limit the scope of protection represented by the claims.

What is claimed is:

1. An accumulator for temporarily accumulating elongated products comprising at least two continuous flexible members for supporting said products and developing along respective closed paths reciprocally parallel defined by a plurality of guide wheels, wherein supports for said products project laterally with respect to a respective one of said at least two flexible members;

each of said at least two flexible members and at least one first of the said guide wheels in the respective closed paths is constructed and arranged such that the supports face an axis of the guide wheels in a section of a flexible member trained about said first of said second guide wheels;

and said at least one first of the guide wheels is provided with a plurality of radial arms with flexible member contact means; among consecutive radial arms a space being created for the elongated products resting on said supports and positioning of the supports being timed with respect to positioning of the radial arms.

2. Accumulator according to claim 1, wherein said supports project all on a common side of a respective flexible member and extend according to a plane which is parallel to a lying plane of the respective flexible member.

3. Accumulator according to claim 1, wherein a reciprocal distance between said at least two flexible members is shorter than a length of the elongated products to be accumulated in said accumulator.

4. Accumulator according to claim 1, further comprising at least one third intermediate flexible member between the at least two flexible members.

5. Accumulator according to claim 1, wherein said at least two flexible members are chains and said contact means includes one or more teeth meshing said chains.

6. Accumulator according to claim 1, wherein said supports include laminar components rigidly connected to said at least two flexible members.

7. Accumulator according to claim 6, wherein each of said supports includes an end which is fastened to the respective flexible member and a portion forming a resting surface for the products, the supports each being folded between said end and said resting surface to distance the resting surface from a lying surface of the respective flexible member.

8. Accumulator according to claim 5, wherein said supports are rigidly fastened to respective links of said chains.

9. Accumulator according to claim 1, wherein said supports include two counterpoised resting surfaces for said products.

10. Accumulator according to claim 9, wherein said resting surfaces are V-shaped.

11. Accumulator according to claim 1, wherein consecutive radial arms of said at least one guide wheels are reciprocally connected in an innermost radial area by an approximately circular profile.

12. Accumulator according to claim 1, wherein said radial arms include an intermediate tapered area, with a radially outermost end of each of said radial arms having a development in a tangential direction which is greater than a width of said intermediate tapered area.

13. Accumulator according to claim 1, wherein the radial arms of said first of said guide wheels of said respective closed paths are reciprocally and angularly displaced.

14. Accumulator according to claim 1, further comprising at least a first set of guide wheels and at least a second set of guide wheels for each of said at least two flexible members, and wherein the supports in a section of flexible member trained about each guide wheel of said first set of guide wheels face towards axes of the guide wheels themselves.

15. Accumulator according to claim 14, wherein said second set of guide wheels has fixed axes, while wheels in said first set of guide wheels are supported by mobile equipment.

16. Accumulator according to claim 1, further comprising a first set and a second set of fixed axis guide wheels and a first set and a second set of guide wheels supported by mobile equipment for each of said at least two flexible members; the supports in a section of flexible member trained about said first set and said second set of guide wheels supported by mobile equipment facing the axes of the wheels themselves.

17. Accumulator according to claim 15, wherein a profile for guiding and retaining the products on said supports is developed around at least a portion of said fixed axis guide wheels.

18. Accumulator according to claim 16, wherein a profile for guiding and retaining the products on said supports is developed around at least a portion of said fixed axis guide wheels.

* * * * *